(12) United States Patent
Düll et al.

(10) Patent No.: US 12,254,389 B2
(45) Date of Patent: Mar. 18, 2025

(54) CONTROLLER FOR CONTROLLING A TECHNICAL SYSTEM, AND METHOD FOR CONFIGURING THE CONTROLLER

(71) Applicant: Siemens Aktiengesellschaft, Munich (DE)

(72) Inventors: Siegmund Düll, Munich (DE); Kai Heesche, Munich (DE); Volkmar Sterzing, Neubiberg (DE); Marc Christian Weber, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1098 days.

(21) Appl. No.: 17/254,926

(22) PCT Filed: Jun. 26, 2019

(86) PCT No.: PCT/EP2019/067036
§ 371 (c)(1),
(2) Date: Dec. 22, 2020

(87) PCT Pub. No.: WO2020/002447
PCT Pub. Date: Jan. 2, 2020

(65) Prior Publication Data
US 2021/0256428 A1 Aug. 19, 2021

(30) Foreign Application Priority Data
Jun. 27, 2018 (EP) .................................. 18180156

(51) Int. Cl.
*G06N 20/10* (2019.01)
*G05B 13/02* (2006.01)
*G06N 3/08* (2023.01)

(52) U.S. Cl.
CPC ......... *G06N 20/10* (2019.01); *G05B 13/0265* (2013.01); *G06N 3/08* (2013.01)

(58) Field of Classification Search
CPC ...... G06N 20/10; G06N 3/08; G05B 13/0265; G05B 19/42; G05B 2219/1134;
(Continued)

(56) References Cited

U.S. PATENT DOCUMENTS

| 2010/0094788 A1 | 4/2010 | Schaefer et al. |
| 2013/0013543 A1 | 1/2013 | Düll et al. |

(Continued)

FOREIGN PATENT DOCUMENTS

| CA | 3013959 A1 * | 8/2017 | ........... A61B 5/0035 |
| CA | 3017027 C * | 9/2017 | |

(Continued)

OTHER PUBLICATIONS

Lennart Ljung, "System Identification Toolbox", 2001, Gefunden Im Internet: URL:https://instruct.uwo.ca/engin-sc/391 b/downloads/IDENT_TB.PDF.
(Continued)

*Primary Examiner* — Steven P Sax
(74) *Attorney, Agent, or Firm* — Schmeiser, Olsen & Watts, LLP

(57) ABSTRACT

A technical system controller is trained using a machine learning method. For this purpose, a chronological sequence of training data is detected for the machine learning method. The training data includes state data, which specifies states of the technical system, and control action data, which specifies control actions of the technical system. A chronological sequence of control action data is extracted specifically from the training data and is checked for a change over time. If a change over time is ascertained, a time window including the change is ascertained, and training data which can be found within the time window is extracted in a manner which is specific to the time window. The controller is then trained by the machine learning method using the
(Continued)

extracted training data and is thus configured for controlling the technical system.

14 Claims, 2 Drawing Sheets

(58) Field of Classification Search
CPC ..... B25J 11/009; B62D 57/032; A47J 36/321; Y10S 901/01; G06F 9/4881; G06F 9/4887; G06F 17/148; G06F 17/142; F02N 11/0844; F02N 11/0833; G01M 13/045
See application file for complete search history.

(56) References Cited

U.S. PATENT DOCUMENTS

| | | | |
|---|---|---|---|
| 2013/0033494 A1 | 2/2013 | Kiyota | |
| 2014/0100703 A1 | 4/2014 | Dull et al. | |
| 2018/0136633 A1* | 5/2018 | Small | G06Q 30/018 |
| 2018/0204002 A1* | 7/2018 | Khorrami | G06F 21/566 |
| 2018/0284758 A1* | 10/2018 | Cella | G06N 3/088 |
| 2019/0310648 A1* | 10/2019 | Yang | G06N 20/20 |
| 2019/0317513 A1* | 10/2019 | Zhang | G06V 10/776 |
| 2020/0064788 A1 | 2/2020 | Hentschel et al. | |

FOREIGN PATENT DOCUMENTS

| | | | | |
|---|---|---|---|---|
| CA | 3000493 A1 | * | 10/2019 | ......... G06Q 20/3224 |
| CA | 3031092 C | * | 1/2023 | ........... F02F 7/0046 |
| CN | 102542818 A | * | 7/2012 | |
| CN | 102792334 A | | 11/2012 | |
| CN | 103597413 A | | 2/2014 | |
| CN | 106371610 A | * | 2/2017 | ............... A61B 5/72 |
| CN | 106762316 A | * | 5/2017 | |
| CN | 108091135 A | * | 5/2018 | ............ G06N 3/006 |
| CN | 108181107 A | * | 6/2018 | .......... G01M 13/045 |
| CN | 109784561 A | | 5/2019 | |
| CN | 110709866 A | * | 1/2020 | .......... G02B 6/1228 |
| CN | 110678816 B | * | 2/2021 | ........... G05B 13/027 |
| CN | 109074279 B | * | 2/2022 | ........... G05B 19/054 |
| DE | 102010011221 A1 | | 9/2011 | |
| DE | 102016224207 A1 | | 6/2018 | |
| SG | 10202000787P A | * | 3/2020 | |

OTHER PUBLICATIONS

Ivo Houtzager, "Towards Data-Driven Control for Modem Wind Turbines", 2011, Gefunden im Internet: URL:https://www.dcsc.tudelft.nl/-jwvanwingerden/documents/houtzager_thesis.pdf.

Lennart Ljung, "System identification Toolbox", 2012, For Use with MATLAB, User's Guide Version 5 URL:https://www.researchgate.neVpublication/37405937_System_Identification_Toolbox_for_use_with_MATLAB.

Yang Fan et al: "Learning What Data to L.earn", XP055476976, Gefunden im Internet: URL:https://arxiv.org/pdf/1702.08635.pdf; [gefunden am Dec. 3, 2018] the whole document; 2017.

Venugopal K P et al: "A recurrent neural network controller and learning algorithm for the on-line learning control of autonomous underwater vehicles", Neural Networks, Elsevier Science Publishers, Barking, GB, vol. 7, No. 5, pp. 833-846, XP024392946, ISSN: 0893-6080, DOI: 10.1016/0893-6080(94)90104-X, [gefunden am Jan. 1, 1994]; pp. 833-836; 1994.

Psaltis D et al: "A multi l ayered neural network controller", IEEE Control Systems Magazine, IEEE Sewrvice Center, Piscataway, NJ, US, vol. 8, No. 2, pp. 17-21, XP011417106, ISSN: 0272-1708, DOI: 10.1109/37.1868; pp. 17-19; 1988.

Kaushik Saurav: "Introduction to Feature Selection methods with an example (or how to select the right variables?)", XP002787063, Gefunden im Internet: URL:https://www.analyticsvidhya.com/blog/2016/12/introduction-to-feature-selection-methods-with-an-example-or-how-to-select-the-right-variables/ [gefunden am Dec. 4, 2018], the whole document; 2016.

Jie Cai et al: "Feature selection in machine learning: A new perspective", Neurocomputing, vol. 300, pp. 70-79, XP055529887, Amsterdam, NL ISSN: 0925-2312, DOI:10.1016/j.neucom.2017.11.077, the whole document; 2018.

Brownlee Jason: "How to Prepare Data for Machine Learning", XP002787068, Gefunden im Internet: URL:https://machinelearningmastery.com/how-to-prepare-data-for-machine-learning/; [gefunden am Dec. 4, 2018], the whole documen; 2013.

Maladkar Kishan: "How to Get Started With Preparing Data for Machine Learning", XP002787062, Gefunden im Internet: URL:https://www.analyticsindiamag.com/get-started-preparing-data-machine-learning/; [gefunden am Dec. 4, 2018], the whole document; 2018.

PCT International Search Report mailed Oct. 7, 2019 corresponding to PCT International Application No. PCT/EP2019/067036 filed Jun. 26, 2019.

* cited by examiner

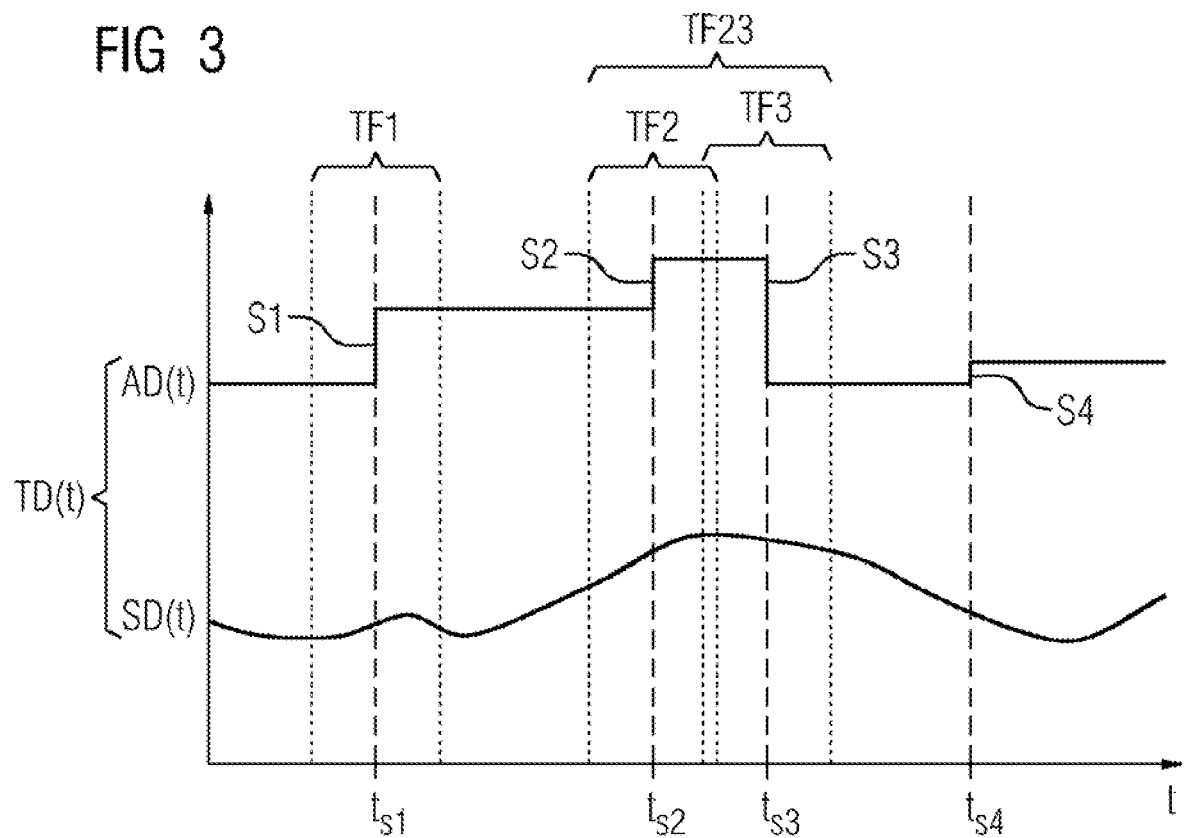

CONTROLLER FOR CONTROLLING A TECHNICAL SYSTEM, AND METHOD FOR CONFIGURING THE CONTROLLER

CROSS-REFERENCE TO RELATED APPLICATIONS

This application claims priority to PCT Application No. PCT/EP2019/067036, having a filing date of Jun. 26, 2019, which is based on EP Application No. 18180156.4, having a filing date of Jun. 27, 2018, the entire contents both of which are hereby incorporated by reference.

FIELD OF TECHNOLOGY

Complex technical systems such as e.g. gas turbines, wind turbines, solar power stations, internal combustion engines, production plants or electricity grids usually require a sophisticated configuration for productive operation, for example in order to specifically optimize a return, a resource requirement, an efficiency, an emission of pollutants, a stability, a level of wear and/or other target parameters of the technical system.

BACKGROUND

Contemporary control devices of technical systems frequently use machine learning methods for configuration. Such learning methods can be used to train a control device, on the basis of training data, to ascertain from current operating data of the technical system those control actions for controlling the technical system that specifically cause a desired or otherwise optimum behavior in the technical system. A multiplicity of known learning methods are available for these purposes, such as e.g. reinforcement learning methods. The training data used can be in particular historical and/or current operating data of the technical system or of similar technical systems.

Known learning methods usually require a large volume of training data for successful training, which training data should moreover cover the operating conditions of the technical system as representatively as possible. Too small a volume of representative training data or too little coverage of relevant operating conditions can adversely affect the success of training.

SUMMARY

An aspect relates to a control device for controlling a technical system and a method for configuring the control device that permit more efficient training.

To configure a control device for a technical system by a machine learning method, a temporal sequence of training data for the machine learning method is captured. The training data in this instance comprise state data specifying states of the technical system and control action data specifying control actions of the technical system. The technical system may be in particular a gas turbine, a wind turbine, a solar power station, an internal combustion engine, a production plant, a traffic control system, an energy control unit for a building, a power transmission system or a 3D printer. A temporal sequence of the control action data is specifically extracted from the training data and checked for a change over time. Detection of a change over time results in a time window that comprises this change being ascertained, and the training data situated within the time window are extracted on a time-window-specific basis. The control device is then trained on the basis of the extracted training data, by the machine learning method and thus configured to control the technical system.

To carry out the method according to embodiments of the invention there is provision for a control device, a computer program product (non-transitory computer readable storage medium having instructions, which when executed by a processor, perform actions) and a computer-readable storage medium.

The method according to embodiments of the invention and the control device according to embodiments of the invention can be carried out or implemented by one or more computers, processors, application-specific integrated circuits (ASICs), digital signal processors (DSPs) and/or what are known as field-programmable gate arrays (FPGAs), for example.

If a respective time window is specifically ascertained such that it comprises a change in control action data over time, it can be expected that the training data contained in the time window contain an above-average amount of information about effects of control interventions on states of the technical system. It turns out that the specific extraction of training data situated within the time window and the use of the training data for training the control device often allow interrelationships between control interventions and the effects thereof to be learned considerably more quickly and more efficiently. Contrary to a popular school of thought, in many cases it can be observed that training restricted to specifically selected training data is more efficient than training using all of the training data. Less relevant or redundant training data can often even reduce the success of training.

The machine learning method can advantageously use or implement a reinforcement learning method, an artificial neural network, a recurrent neural network, a convolutional neural network, an autoencoder, a deep learning architecture, a support vector machine, a data-driven trainable regression model, a k nearest neighbor classifier, a physical model and/or a decision tree. A multiplicity of efficient implementations are available for the indicated variants. Embodiments of the invention can in particular improve a stability and convergence of what is known as a Q function for reinforcement learning methods.

According to an advantageous embodiment of the invention, training data situated outside the time window can be suppressed or rejected during the training of the control device. Alternatively or additionally, the training data situated outside the time window can be provided with a lower weighting than the extracted training data during training.

According to an advantageous embodiments of the invention, operating data of the technical system can be captured in the course of operation and integrated into the sequence of the training data. The control device can then continue to be trained on the basis of the extracted training data, in the course of operation; in particular while the control device controls the technical system. In this manner it is possible for the control device to be adapted for, e.g. wear-dependent, changes in the behavior of the technical system that occur during operation. Alternatively or additionally, the control device can, at least sometimes, be trained beforehand or offline.

Furthermore, the check for a change in the sequence of the control action data over time can involve a stipulated change pattern being sought in this sequence, e.g. by a pattern recognition method. The change over time can then be detected as a result of the change pattern being found.

Furthermore, the check for a change in the sequence of the control action data over time can involve a measure of change being ascertained on the basis of a comparison, a difference formation, a weighted difference formation and/or a difference quotient for control action data associated with various times. A change over time can then be detected on the basis of the ascertained measure of change. The measure of change calculated can be in particular an absolute value or a square of a difference or of a difference quotient for successive control action data. It is also possible for higher difference quotients to be taken into consideration. The measure of change allows the respective change over time to be quantified.

If the control action data respectively comprise multiple components, a component-specific measure of change can be ascertained for each of the components of the control action data. Each of these components can be individually checked for a change over time.

The criterion used for detection of a change over time can be a possibly multicomponent threshold value being exceeded by a respective measure of change.

According to advantageous embodiments of the invention, a rate and/or an amplitude of changes in the sequence of the control action data over time can be ascertained. A length of the time window, a threshold value for comparison with a measure of change for the changes over time and/or a change pattern can then be defined on the basis of the ascertained rate and/or amplitude. Alternatively or additionally, the length of the time window, the threshold value and/or the change pattern can be defined on the basis of internal correlations or other statistical properties of the control action data or the training data.

According to further advantageous embodiments of the invention, a target function can be provided, which takes at least a portion of the state data as a basis for ascertaining a performance parameter to be optimized during operation of the technical system. Such a target function is frequently also referred to as a reward function. The control device can then be trained to optimize the performance parameter on the basis of the portion of the state data that is contained in the extracted training data. An optimization will also be understood here and below to mean an approach toward an optimum. The performance parameter can relate in particular to a return, a yield, an efficiency, an emission of pollutants or a resource consumption of the technical system or of a part thereof or to a possibly weighted combination of these parameters. The target function can calculate the performance parameter from state data or other operating data, e.g. environmental data of the technical system.

A multiplicity of known methods, in particular of reinforcement learning and supervised learning, are available for optimizing the performance parameter.

Furthermore, a share of the extracted training data in a total volume of the training data can be ascertained. The ascertained share can then be taken as a basis for ascertaining a measure of quality for the training data and outputting the measure of quality to control the technical system. Such a measure of quality can provide a certain degree of quantification for an information density of the training data that is relevant to the training. If multiple sequences of training data are available, a sequence having a high measure of quality can be selected and used for training.

According to advantageous embodiments of the invention, the training data and/or the extracted training data can be aggregated by an aggregation function. The training can then be effected on the basis of the aggregated training data. Such aggregation allows the training data or the extracted training data to be combined or reduced on a time-window-specific basis, e.g. by virtue of a possibly weighted average or median, a maximum or a minimum for multiple temporally successive training data being continually formed.

BRIEF DESCRIPTION

Some of the embodiments will be described in detail, with references to the following Figures, wherein like designations denote like members, wherein:

FIG. 3 shows a graph containing training data plotted against time.

DETAILED DESCRIPTION

Figure 1:
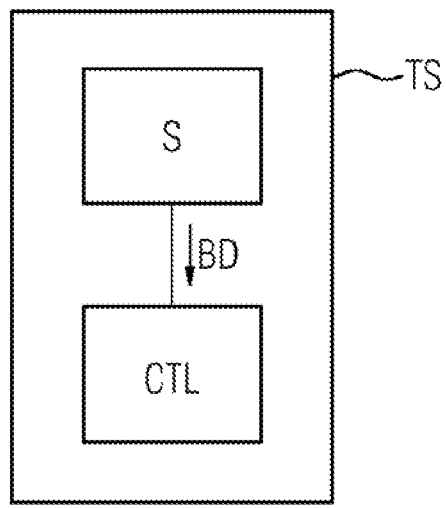
FIG. 1 shows a gas turbine having a control device according to embodiments of the invention.

FIG. 1 provides an illustrative visualization of a gas turbine as a technical system TS. Alternatively or additionally, the technical system TS can also comprise a wind turbine, a solar power station, an internal combustion engine, a production plant, a traffic control system, an energy control unit for a building, a power transmission system, such as e.g. an electricity grid, a 3D printer or another system for additive manufacture.

The gas turbine TS is coupled to a control device CTL, which is trainable in computer-aided fashion and which may be implemented as part of the gas turbine TS or wholly or in part externally to the gas turbine TS. The control device CTL is used to control the technical system TS and, for this purpose, is trainable by a machine learning method. Control of the technical system TS will also be understood in this instance to mean automatic control of the technical system TS and output and use of control-relevant data and control signals, i.e. data and control signals that contribute to controlling the technical system TS.

Control-relevant data of this kind can comprise in particular control action data, forecast data, monitoring data and/or classification data, which can be used in particular for optimizing operation of, monitoring or maintaining the technical system TS and/or for detecting wear or damage.

The gas turbine TS moreover has sensors S coupled to the control device CTL that continually measure one or more operating parameters of the technical system TS and transmit them to the control device CTL in the form of operating data BD. Besides the sensor data, the control device CTL can also capture further operating parameters from other data sources of the technical system TS or from external data sources.

The operating data BD can be understood here and below to mean in particular physical, control-oriented, operative and/or design-dependent operating variables, property data, performance data, effect data, state data, system data, stipulated values, control data, sensor data, measured values, environmental data, monitoring data, forecast data, analysis data and/or other data obtained during operation of the technical system TS and/or describing an operating state or a control action of the technical system TS. These can be e.g. data about temperature, pressure, emissions, vibrations, oscillation states or resource consumption of the technical system TS. Specifically in the case of a gas turbine, the operating data BD can relate to a turbine output, a rotation speed, vibration frequencies or vibration amplitudes. The operating data BD may be scalar, vector-valued or tensor-valued and in particular highly dimensional.

Figure 2:
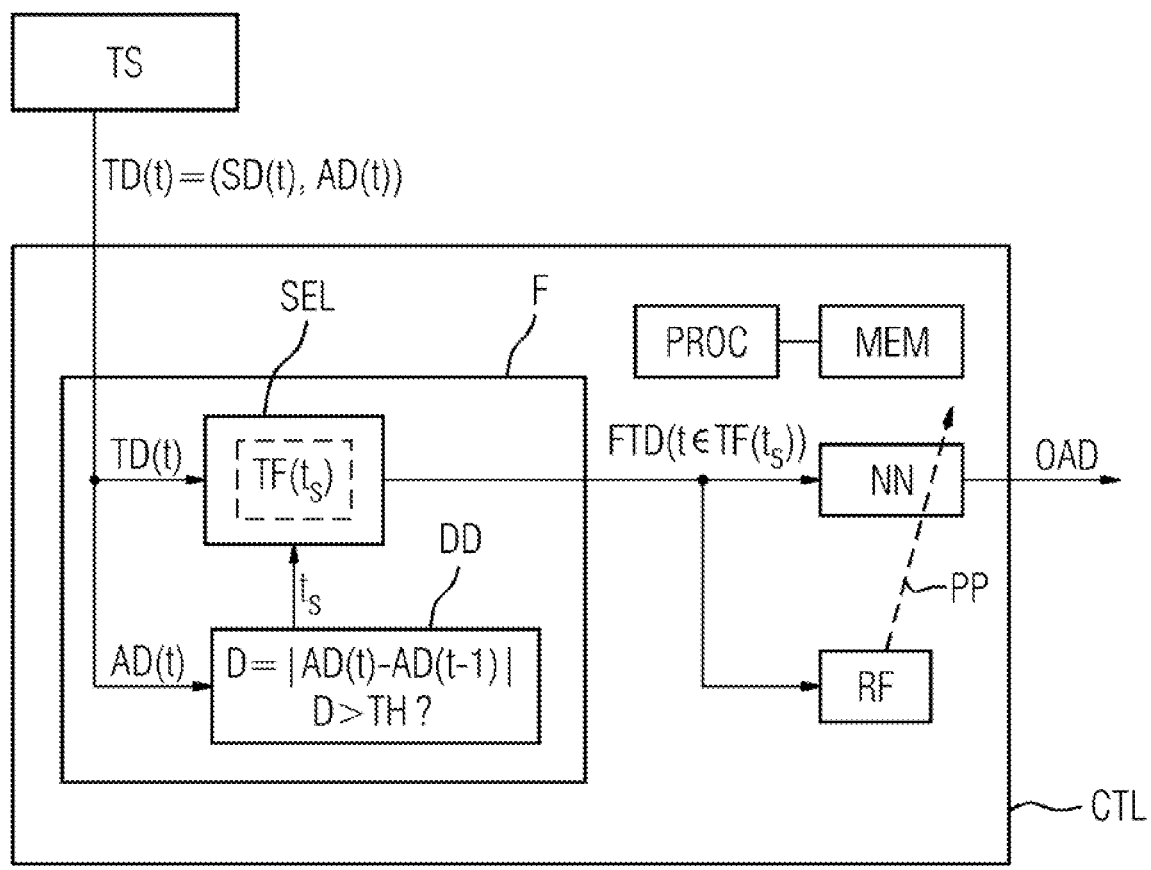
FIG. 2 shows a control device according to embodiments of the invention in a training phase.

FIG. 2 shows a schematic depiction of a control device CTL according to embodiments of the invention in a training phase, which configures the control device CTL for optimized control of a technical system TS. The control device CTL is coupled to the technical system TS.

The control device CTL and the technical system TS may be designed or implemented as described in conjunction with FIG. 1. The control device CTL has one or more processors PROC for carrying out all of the method steps of the control device CTL and has one or more memories MEM, coupled to the processor PROC, for storing the data to be processed by the control device CTL.

The technical system TS captures a temporal sequence of operating data, which comprise both state data and control action data, by sensor and transmits the temporal sequence as training data TD(t) to the control device CTL. Here and below, t denotes a temporal dependency of a respective variable or the association thereof with a respective time t.

The temporal sequence of the training data TD(t) comes from the technical system TS in the present exemplary embodiment. In general, however, the training data used can be any historical or current operating data of the technical system TS or of similar technical systems that can be used for training.

The training data TD(t) contain in particular a temporal sequence of state data SD(t) and a temporal sequence of control action data AD(t). The state data SD(t) in this instance specify operating states of the technical system TS, while the control action data AD(t) specify control actions performed on the technical system TS. The operating states can relate to a power, a rotation speed, a temperature, a pressure, an oscillation state and/or an emission of the technical system, for example.

The control device CTL has a data-driven trainable arithmetic module NN that implements a machine learning method. In the present exemplary embodiment, the trainable arithmetic module NN has an artificial neural network by which a reinforcement learning method is implemented. A trainable arithmetic module of this kind or an appropriately trained control device is frequently also referred to as a trainable or learning policy agent or as a control model. The neural network of the arithmetic module NN has a training structure that develops during a training.

A training will generally be understood to mean an optimization of a mapping of input parameters of a parameterized system model, e.g. of a neural network, onto one or more output parameters. This mapping is optimized according to stipulated, learned and/or learnable criteria during a training phase. The criterion used, e.g. in the case of control models, can be a success of control actions, which can relate to e.g. a return, a resource requirement, an emission of pollutants, a level of wear or another parameter that quantifies a performance of the technical system. A training structure can comprise e.g. a networking structure of neurons of a neural network and/or weights of connections between the neurons, which are developed by the training such that the criteria are satisfied as well as possible.

In the present exemplary embodiment, the arithmetic module NN is trained by a reinforcement learning method to control the technical system TS in optimized fashion. This involves the arithmetic module NN being trained to take operating data of the technical system TS that are supplied as input parameters as a basis for outputting optimized control action data OAD as output parameters that optimize a target function RF. A multiplicity of known standard routines are available for such learning methods.

The target function RF uses supplied operating data to calculate a performance parameter PP that can be optimized by the learning method. For this purpose, the values of the performance parameter PP that are calculated by the target function RF are supplied to the arithmetic module NN, as indicated by a dashed arrow in FIG. 2. Therefore the training structure of the neural network is adapted by the learning method such that the output parameters OAD of the neural network optimize the performance parameter PP.

The performance parameter PP quantifies a desired behavior of the technical system TS. As such, the performance parameter PP used can be for example a possibly weighted combination of return, yield, efficiency, emission of pollutants, level of wear and resource consumption of the technical system TS or of a part thereof or another parameter relating to a performance of the technical system TS. By optimizing the performance parameter PP, the arithmetic module NN is trained to output optimized control action data OAD and in this way the control device CTL is configured for optimized control of the technical system TS.

A target function, in this instance RF, for calculating a performance parameter, in this instance PP, is frequently also referred to as a reward function. The performance parameter indicates a long-term gain or an overall reward.

The operating data used in the target function RF are frequently also referred to as target data and are usually part of the state data of the technical system TS that are contained in the operating data. A multiplicity of methods are known for calculating performance parameters from target data of the technical system TS.

It turns out that the training success of the arithmetic module NN is substantially dependent on the quality of the training data TD. With this in mind, it is an aim according to embodiments of the invention to strive to find and extract those training data that are particularly useful for training or for training success.

In order to select and extract these training data that are beneficial for training, the control device CTL contains a filter F to which the training data TD(t) are transmitted. The filter F is used to identify time periods or time windows TF that contain training data beneficial for training and to specifically extract or filter out these training data that are beneficial for training.

It turns out that those training data that contain information about effects of control interventions on states of the technical system TS are particularly beneficial for training. Focusing the learning method on such training data usually allows interrelationships between control interventions and the effects thereof to be learned considerably more quickly and more efficiently. It is therefore found to be advantageous to identify those time windows in which control actions are applied or change, i.e. in which control actions change over time, or to give preference to these time windows during training.

In order to detect a change in the control actions over time, the filter F comprises a change detector DD to which the temporal sequence of the control action data AD(t) is transmitted. To this end, the control action data AD(t) are specifically extracted from the training data TD(t) by the filter F.

In order to detect the change in the control action data AD(t) over time, the change detector DD continually ascertains a measure of change D. The latter can be calculated for example as the absolute value of a difference between successive control action data $|AD(t)-AD(t-1)|$ or as the square of such a difference $(AD(t)-AD(t-1))^2$. In the case of multicomponent control action data AD(t), correspondingly multidimensional Euclidean or weighted distances between successive control action vectors can be ascertained as measure of change D.

The change detector DD compares the continually ascertained measures of change D with a stipulated or otherwise determined threshold value TH and detects a change in the control action data AD(t) over time as a result of this threshold value TH being exceeded. In the case of multi-component control action data there may be provision for accordingly component-specific threshold values. Alternatively or additionally, the change detector DD can search the sequence of the control action data AD(t) for a stipulated or otherwise determined change pattern and detect a change in the control action data AD(t) over time as a result of this change pattern occurring.

A respective point of change in the sequence of the control action data AD(t) is ascertained as a result of a respective change being detected. In the present exemplary embodiment, the respective point of change ascertained is a respective change time $t_s$ at which the threshold value TH is exceeded by the respective measure of change D.

The ascertained change times $t_s$ are transmitted by the change detector DD to a selection module SEL of the filter F. This selection module SEL also has the sequence of the training data TD(t) transmitted to it. The selection module SEL takes each of the change times $t_s$ as a basis for ascertaining a time window TF that comprises the respective change time $t_s$. The respective time window TF is centered around the respective change time $t_s$. The time window obtained in this case is the time period $TF(t_s)=[t_s-L/2, t_s+L/2]$, where L denotes a length of the time window TF.

The length L of the time window can be defined, depending on the technical system TS to be controlled, on the basis of a reaction time of the sensors of the technical system, a reaction time in response to control measures, a time for ambient conditions to change or on the basis of another time scale definitive for the control of the technical system TS. In the case of gas turbines or wind turbines, there may be provision for a length L of between one second and three or more minutes, in particular a length of 30 to 60 seconds.

The threshold value TH and the length L can be determined on the basis of an analysis of the changes in the sequence of the control action data AD(t) over time. As such, e.g. a rate and/or an amplitude of the fluctuations in the control action data AD(t) can be ascertained and the threshold value TH and the length L can be calculated or modified on the basis thereof. In particular, a lower threshold value TH can be defined for larger amplitudes and a shorter length L can be defined for higher rates.

The ascertainment of the time windows TF is illustrated further with reference to FIG. 3. FIG. 3 shows a graph in which a sequence of training data TD(t) is plotted against time t. The training data TD(t) comprise state data SD(t), which are illustrated in the lower part of the graph, and control action data AD(t), which are illustrated in the top part. For reasons of clarity, only a characteristic for a single value is depicted in highly simplified fashion in each case.

The sequence of the control action data AD(t) is shown by multiple changes S1, S2, S3 and S4 over time at the times $t_{s1}$, $t_{s2}$, $t_{s3}$ and $t_{s4}$. At the change times $t_{s1}$, $t_{s2}$ and $t_{s3}$ the ascertained measure of change D is above the threshold value TH, and at $t_{s4}$ it is below it. The change S4 is consequently rejected and therefore does not define a time window. By contrast, the change S1 over time and the time $t_{s1}$ define a time window TF1, the change S2 and the time $t_{s2}$ define a time window TF2 and the change S3 and the time $t_{s3}$ define a time window TF3. The time windows TF2 and TF3 overlap and are consequently combined to form a joint time window $TF23=[t_{s2}-L/2, t_s3+L/2]$.

The further course of the method according to embodiments of the invention is illustrated again with reference to FIG. 2.

On the basis of the ascertained time windows TF the selection module SEL specifically selects and extracts those of the training data TD(t) that are situated within these time windows TF. These training data situated within the time windows TF are subsequently referred to as extracted or filtered training data FTD. For a (nonoverlapping) time window TF comprising the change time $t_s$, the extracted training data may be given by $FTD=\{TD(t_s-L/2), \ldots, TD(t_s+L/2)\}$, for example.

The training data FTD selected and filtered on a time-window-specific basis are transmitted from the selection module SEL or from the filter F to the arithmetic module NN. Furthermore, the filtered training data FTD are supplied to the target function RF, which calculates the performance parameter PP from the operating data contained in the extracted training data FTD and in particular from the state data contained in the operating data. On the basis of the extracted training data FTD and the calculated performance parameter PP the neural network of the arithmetic module NN is trained, as already indicated above, such that control action data OAD are output that—when applied to the technical system TS—optimize the performance parameter PP.

In the present exemplary embodiment, no training data situated outside the time windows TF are supplied to the arithmetic module NN and the neural network is thus trained exclusively on the basis of the extracted training data FTD. As already mentioned above, in particular a reinforcement learning method may be implemented in the arithmetic module NN as an alternative or in addition to the neural network. If training data that are close in time to control interventions or changes in the control action data are found to be particularly beneficial for training, it is usually possible to improve training success or to reduce training effort.

Alternatively, training data situated outside the time windows can also be supplied to the arithmetic module NN. In this case the arithmetic module NN can be trained at least or predominantly on the basis of the filtered training data FTD. As such, the filtered training data FTD can be provided with a higher weighting during training than the training data situated outside the time windows, or the latter training data can be reduced, thinned out and/or in some cases rejected.

The extracted training data FTD and the share thereof in a total volume of the training data TD can be taken as a basis for deriving a measure of quality for the training data TD. A measure of quality determined in this manner can provide a certain degree of quantification for an information density relevant to the training.

It is possible for continually and currently captured training data TD(t) to be continually filtered by the filter F and for the control device CTL to continue to be trained on the basis of the filtered training data FTD in the course of operation.

It is optionally possible for the filter F and the arithmetic module NN to have an aggregator (not depicted) interposed between them that aggregates, i.e. combines and/or reduces, the filtered training data FTD on a time-window basis. The aggregated training data are then transmitted to the arithmetic module NN for training. The aggregation can be effected by forming an average, a median, a minimum and/or a maximum for a stipulated section of the sequence of the filtered training data FTD, for example.

As a result of the neural network and hence the arithmetic module NN being trained, the control device CTL is configured for optimized control of the technical system TS. For control, the control device CTL applies the control strategy learned from the training, i.e. maps current system states onto control actions that are optimum in terms of the target function RF.

The specific filtering of the training data means that the arithmetic module NN is trained by training data that are particularly beneficial for training. These selected training data FTD contain a particularly large number of correlations between control interventions and the effects thereof on system states of the technical system TS and are therefore particularly representative of the control of the technical system. The specific selection of the training data can effectively prevent redundant, less relevant or less significant information from disrupting or slowing down the learning process. It is evident that embodiments of the invention's filtering of the training data can significantly improve training success and can significantly reduce training effort.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for configuring a control device for a technical system by a machine learning method, wherein
   a) a temporal sequence of training data for the machine learning method is captured, wherein the training data comprise state data specifying states of the technical system and control action data specifying control actions of the technical system,
   b) a temporal sequence of the control action data is specifically extracted from the training data,
   c) the sequence of the control action data is checked for a change over time, and detection of a change over time results in a time window that comprises the change over time of the control action data being ascertained,
   d) the training data situated within the time window that comprises the change over time of the control action data are extracted on a time-window-specific basis to provide extracted time-window-specific training data that is a filtered subset of the temporal sequence of training data, and
   e) the control device is trained, on the basis of the extracted time-window-specific training data, by the machine learning method and thus configured to control the technical system, and
      wherein training data situated outside the time window that comprises the change over time of the control action data are suppressed, rejected, and/or given a lower weighting during the training of the control device.

2. The method as claimed in claim 1, wherein the technical system is a gas turbine, a wind turbine, a solar power station, an internal combustion engine, a production plant, a traffic control system, an energy control unit for a building, a power transmission system and/or a 3D printer.

3. The method as claimed in claim 1, wherein the machine learning method uses or implements a reinforcement learning method, an artificial neural network, a recurrent neural network, a convolutional neural network, an autoencoder, a deep learning architecture, a support vector machine, a data-driven trainable regression model, a k nearest neighbor classifier, a physical model and/or a decision tree.

4. The method as claimed in claim 1, wherein operating data of the technical system are captured in the course of operation and integrated into the sequence of the training data, and in that the control device continues to be trained, on the basis of the extracted training data, in the course of operation.

5. The method as claimed in claim 1, wherein the check for a change in the sequence of the control action data over time involves a stipulated change pattern being sought in this sequence, and in that the change over time is detected as a result of the change pattern being found.

6. The method as claimed in claim 1, wherein the check for a change in the sequence of the control action data over time involves a measure of change being ascertained on at least one of the basis of a comparison, a difference formation, a weighted difference formation and a difference quotient for control action data associated with various times, and in that a change over time is detected on the basis of the ascertained measure of change.

7. The method as claimed in claim 6, wherein the control action data respectively comprise multiple components, and in that a component-specific measure of change is ascertained for each of the components of the control action data.

8. The method as claimed in claim 1, wherein at least one of a rate and an amplitude of changes in the sequence of the control action data over time is ascertained, and in that a length of the time window and/or a threshold value for comparison with a measure of change for the changes over time is defined on the basis of at least one the ascertained rate and amplitude.

9. The method as claimed in claim 1, wherein a target function is provided, which takes at least a portion of the state data as a basis for ascertaining a performance parameter to be optimized during operation of the technical system, and in that the control device is trained to optimize the performance parameter, on the basis of the portion of the state data that is contained in the extracted training data.

10. The method as claimed in claim 1, wherein a share of the extracted training data in the training data is ascertained, and in that the ascertained share is taken as a basis for ascertaining a measure of quality for the training data and outputting the measure of quality to control the technical system.

11. The method as claimed in claim 1, wherein the training data and/or the extracted training data are aggregated by an aggregation function, and in that the training is effected on the basis of the aggregated training data.

12. A control device for controlling a technical system, designed to carry out a method as claimed in claim 1.

13. A computer program product, comprising a computer readable hardware storage device having computer readable program code stored therein, said program code executable by a processor of a computer system to implement a method designed to carry out a method as claimed in claim 1.

14. A computer-readable storage medium having a computer program product as claimed in claim 13.

* * * * *